Patented Sept. 17, 1940

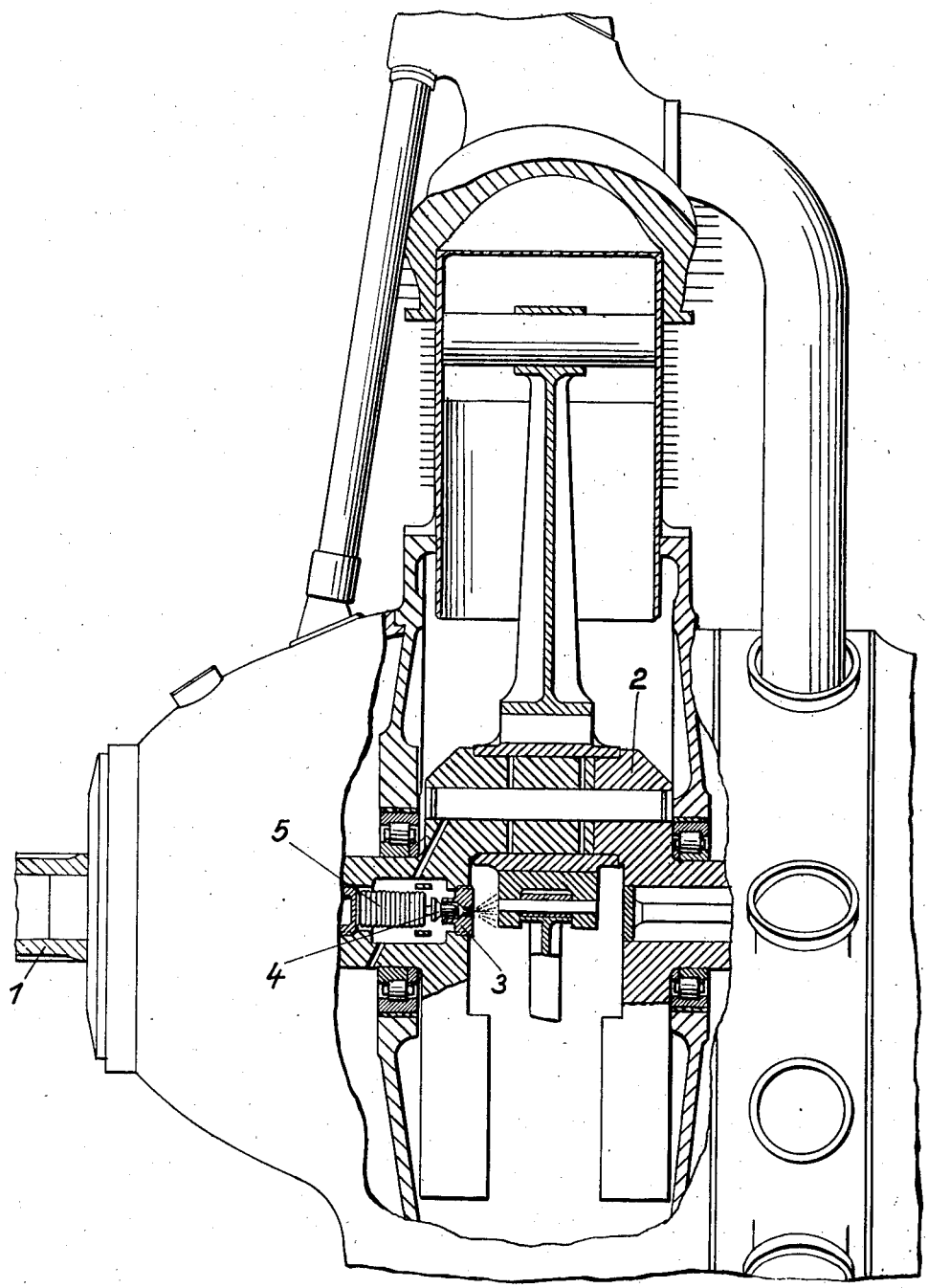

2,215,086

UNITED STATES PATENT OFFICE 2,215,086

LUBRICATING DEVICE FOR AIRCRAFT ENGINES

Otto Schwager, Munich, Germany, assignor to the firm: Bayerische Motoren Werke Aktiengesellschaft, Munich, Germany Application November 1, 1938, Serial No. 238,142
In Germany February 11, 1937

6 Claims. (Cl. 184—6)

The present invention relates to a lubricating device for aircraft engines, especially engines with radially arranged cylinders, wherein a spraying nozzle is mounted in the hollow end of the crank shaft.

An object of this invention is to insure an adequate supply of oil at all times to the cylinder running surfaces and bearing points of an engine.

Another object of this invention is to insure an adequate supply of oil to the cylinder running surfaces and bearing points of an engine when the engine is cold.

Still another object of this invention is to insure an adequate supply of oil to the cylinder running surfaces and bearing points of an engine during the starting of the engine.

A further object of this invention is to provide a supplemental supply of oil to the cylinder running surfaces and bearing points of an engine during starting by an arrangement which may be added in addition to the normal lubricating system.

A more specific object of this invention is to provide a lubricating system for the cylinder running surfaces and bearing points of an engine, which is variable in accordance with the temperature of the lubricating oil.

With these and incidental objects in view, the invention consists in certain novel features of construction and combination of parts which are set forth in the appended claims and a preferred form of embodiment whereof is hereinafter described with reference to the drawing which accompanies and forms part of the specification, wherein the single figure is a partial longitudinal view, partially in cross-section, illustrating a preferred embodiment of my invention as applied to a radial engine.

Into the front hollow end 1 of the crank shaft 2 is fitted the spraying nozzle 3 which is supplied from the pressure oil circulating system and sprays oil on the driving mechanism. This nozzle is provided with an adjustable valve 4 which permits of adjustment of the cross-sectional area of the nozzle.

A thermostat 5, included in the oil circulation and subjected to the temperature thereof, engages the valve 4 and thus controls the quantity of oil flowing through the nozzle 3 automatically dependently on the prevailing oil temperature. Separate adjustment for setting of the thermostat can be made in any well known manner.

By means of the above-described arrangement, it will be seen that when the engine is cold and is started, the thermostat 5, shown in the form of a metal bellows, will contract and withdraw the valve 4 so as to permit the flow of a maximum amount of oil, thereby insuring immediately a full supply of lubricant to the cylinder running surfaces, which otherwise would have an insufficient supply of lubricant. In this manner, the engine may be fully loaded immediately after starting without any danger of seizing. As the engine and the oil heat up and the danger of seizing becomes less, the bellows 5 will expand to move the valve 4 and permit a decreased amount of lubricant to be injected. In this manner, the thermostat controls the supply of lubricant to insure the same or an even greater quantity of oil for lubrication of the cylinder surfaces during cold starting of the engine as compared with that during normal running operation. If desired, as a further safety feature, the thermostat and its associated valve may be adjusted to an excess amount of lubricating oil during the starting period.

While the invention may be particularly adapted for use with radial engines on aircrafts, it may obviously be used with internal combustion engines of all characters and wherever used.

It will be seen therefore that I have provided a device which fulfills the objects primarily stated and while I have shown a single embodiment of my invention, it is clear that other forms thereof may readily be provided without departing from my invention as defined in the following claims.

I claim:

1. A lubricating device for aircraft engines, especially engines in which the cylinders are arranged radially, comprising the combination with a hollow end of a crank shaft mounted in a crank casing, of a nozzle located in said hollow end, said nozzle serving to spray oil into the crank case, a thermostat arranged coaxially to said nozzle, a valve connected to said thermostat and co-operating with said nozzle, said valve being actuated by said thermostat and serving to vary the cross-sectional passage area of the nozzle automatically dependently on the temperature of the oil, whereby the cross-sectional passage area is increased when the oil is cold and reduced when the oil is hot.

2. A lubricating device according to claim 1, including means for adjusting the thermostat.

3. In an internal combustion engine of the type having a plurality of radially disposed cylinders, a crankcase, a crank shaft, pistons in said cylinders, means connecting said crank shaft to said pistons including bearing means, and a source of lubricating fluid under pressure, the combination of a nozzle for directing said fluid into said crankcase against said connecting means, and means responsive to the temperature of said fluid for varying the cross-sectional area of said nozzle.

4. The combination according to claim 3, wherein said last means is so constructed and arranged as to increase said cross-sectional area upon a decrease in the temperature of said lubricating fluid, and vice versa.

5. The combination according to claim 3, wherein said last means includes a valve in said nozzle, and a thermostat subjected to the temperature of lubricating fluid for controlling said valve.

6. The combination according to claim 3, wherein said crank shaft is formed with a hollow space for said lubricating fluid and said nozzle is connected to hollow space, said nozzle controlling means being mounted within said hollow space.

OTTO SCHWAGER.